(12) United States Patent
Halahmi et al.

(10) Patent No.: US 7,674,516 B2
(45) Date of Patent: Mar. 9, 2010

(54) GEOTECHNICAL ARTICLES

(75) Inventors: Izhar Halahmi, Hod Hasharon (IL); Oded Erez, Tel Aviv (IL); Adi Erez, Tel Aviv (IL)

(73) Assignee: PRS Mediterranean Ltd. (IL)

( * ) Notice: Subject to any disclaimer, the term of this patent is extended or adjusted under 35 U.S.C. 154(b) by 0 days.

(21) Appl. No.: 12/204,109

(22) Filed: Sep. 4, 2008

(65) Prior Publication Data
US 2008/0319112 A1    Dec. 25, 2008

(51) Int. Cl.
*C08L 53/00* (2006.01)
*C08L 43/00* (2006.01)
*C08L 27/10* (2006.01)
*C08L 33/00* (2006.01)
*C08L 9/00* (2006.01)
*C08L 39/04* (2006.01)
*C08L 35/02* (2006.01)
*C08F 8/00* (2006.01)
*B32B 1/00* (2006.01)

(52) U.S. Cl. .......... 428/174; 525/88; 525/191; 525/203; 525/209; 525/217; 525/222; 525/232; 525/240; 524/500; 428/178

(58) Field of Classification Search .......... 428/174, 428/178, 180; 525/88, 191, 203, 209, 217, 525/222, 232, 240; 524/500–538
See application file for complete search history.

(56) References Cited

U.S. PATENT DOCUMENTS

| 3,963,799 A | 6/1976 | Starkweather, Jr. |
| 4,346,834 A | 8/1982 | Mazumdar |
| 4,564,658 A | 1/1986 | Liu |
| 5,280,066 A | 1/1994 | Tekkanat et al. |
| 6,046,275 A * | 4/2000 | Nakano et al. ............... 525/98 |
| 6,296,924 B1 | 10/2001 | Bach |
| 6,355,733 B1 | 3/2002 | Williams et al. |
| 6,524,029 B2 * | 2/2003 | Nobert et al. .......... 405/129.75 |
| 6,649,698 B1 | 11/2003 | Mehta |
| 6,875,520 B2 | 4/2005 | Court et al. |

FOREIGN PATENT DOCUMENTS

GB    2266540 A    * 11/1993

* cited by examiner

Primary Examiner—David R Sample
Assistant Examiner—Catherine Simone
(74) Attorney, Agent, or Firm—Richard M. Klein; Fay Sharpe LLP

(57) ABSTRACT

A multiphase polymeric material comprises a first rigid continuous phase and a second elastic phase dispersed in the first phase. The multiphase polymeric material may be formed into polymeric strips and used to make a cellular confinement system which is suitable for use in cold areas.

31 Claims, 4 Drawing Sheets

GEOTECHNICAL ARTICLES

CROSS-REFERENCE TO RELATED APPLICATIONS

This application claims the priority benefit of U.S. application Ser. No. 11/680,979 filed Mar. 1, 2007, now U.S. Pat. No. 7,541,084 the disclosure of which is incorporated herein by reference.

BACKGROUND

The present disclosure relates to polymeric soil reinforcing and geotechnical articles. Strips, sheets, profiles, and cellular confinement systems are made from polymer compositions, such as a multiphase polymeric material, which are optimized for use in subzero temperatures.

Polymeric or plastic soil reinforcing articles, especially cellular confinement systems (CCSs), are used to increase the load bearing capacity, stability and erosion resistance of geotechnical materials such as soil, rock, stone, peat, clay, sand, concrete, aggregate and earth materials which are supported by said CCSs.

CCSs comprise a plurality of high density polyethylene (HDPE) or medium density polyethylene (MDPE) strips in a characteristic honeycomb-like three-dimensional structure. The strips are welded to each other at discrete locations to achieve this structure. Geotechnical materials can be reinforced and stabilized within or by CCSs. The geotechnical material that is stabilized and reinforced by the said CCS is referred to hereinafter as geotechnical reinforced material (GRM). The surfaces of the CCS may be embossed to increase friction with the GRM and decrease relative movement between the CCS and the GRM.

The CCS strengthens the GRM by increasing its shear strength and stiffness as a result of the hoop strength of the cell walls, the passive resistance of adjacent cells, and friction between the CCS and GRM. Under load, the CCS generates powerful lateral confinement forces and soil-cell wall friction. These mechanisms create a bridging structure with high flexural strength and stiffness. The bridging action improves the long-term load-deformation performance of common granular fill materials and allows dramatic reductions of up to 50% in the thickness and weight of structural support elements. CCSs may be used in load support applications such as road base stabilization, intermodal yards, under railroad tracks to stabilize track ballast, retaining walls, to protect GRM or vegetation, and on slopes and channels.

The term "HDPE" refers hereinafter to a polyethylene characterized by density of greater than 0.940 g/cm$^3$. The term medium density polyethylene (MDPE) refers to a polyethylene characterized by density of greater than 0.925 g/cm$^3$ to 0.940 g/cm$^3$. The term linear low density polyethylene (LLDPE) refers to a polyethylene characterized by density of 0.91 to 0.925 g/cm$^3$.

Current commercially available CCSs are generally made solely from HDPE. CCS cell walls made from HDPE are stiff in the vertical direction, maintain some flexibility in the horizontal direction, are dimensionally stable, resist creep relatively well at temperatures from minus 10 to +40° C., and have sufficient stiffness when the cells are empty so the CCS can be applied. GRM is then provided by generally dumping the GRM onto the CCS, then packing the cells within the CCS. If the CCS wall is too flexible, it will collapse during installation in the field, for example when humans walk over the CCS before it is filled with GRM or during the filling and condensing of GRM in the CCS cells.

However, HDPE is relatively rigid; it has a 1% secant flexural modulus according to ASTM D790 of about 950 megapascals (MPa). This rigidity makes the web possible to handle and usable in field operations at ambient conditions (20 to 30° C.). However, installation becomes difficult and sometimes impossible at subzero temperatures, especially temperatures below minus 10° C. HDPE also has high tendency to creep at temperatures of about +40° C. and over.

HDPE is also brittle at low temperatures (i.e. below minus 15° C.) that are typical of places on the globe north of 42 degrees north latitude and south of 42 degrees south latitude (i.e., not near the equator) during certain times of the year, usually autumn and winter. Such low temperatures are also encountered at elevated areas (i.e., about 1000 m above sea level and higher) all over the globe. These areas at which low temperatures are typical are referred to hereinafter as "cold areas". HDPE and MDPE also have poor puncture resistance at cold temperatures. At temperatures lower than minus 10° C., these polymers are no longer tough and ductile, but fragile and brittle.

Two major factors affecting the durability of the CCS are the creep resistance of the plastic material making up the CCS wall and the friction between the cell walls and the GRM. Creep of the CCS wall causes loosening of the friction and loss of structural functionality of the CCS-GRM composite structure. HDPE and other polyolefins fail to resist creep, especially at temperatures higher than about 35-40° C.

The mechanical properties of filled CCSs are a composite phenomenon wherein stiffness and rigidness come from the compacted infill (GRM) being compressed and densified along the plastic CCS cell walls. Friction between the GRM and the cell walls provide integrity, mechanical continuity, and dynamic load bearing. The GRM and the cell walls dynamically support each other and can survive a wide spectrum of loads, vibrations, thermal stresses, and erosion as long as this relationship is maintained. Anytime the load transfer between those two components is breached—due to cell wall creep, rupture or irreversible deformation—the filled CCS structure loses its integrity and cannot provide the required structural strength, dimensional stability and stiffness.

The mechanism of failure of CCSs made from HDPE at sub-zero temperatures is complex. The first step is the cooling of the GRM and CCS. Polyethylene has a high coefficient of thermal expansion (CTE)—about 150-200 ppm/° C. In other words, a 100 meter strip will shorten by about 15-20 centimeters when cooled from minus 15° C. to minus 25° C. However, the GRM generally has a CTE about 5-10 times lower. Because the GRM shrinks much less, stress is generated in the cell walls of the CCS. When the stress is applied for many days at temperatures lower than minus 15° C., the toughness of the HPDE or MDPE is insufficient and a brittle failure occurs. If the GRM is subjected to freezing of water, which expands the GRM, the stress is increased even more. Since crack growth resistance (toughness) of HDPE and MDPE is medium or even low relative to LLDPE or elastomers at those temperatures, the CCS breaks and loses its integrity. However, if LLDPE or elastomers are used as the matrix of the CCS, then the CCS severely creeps at temperatures greater than 40° C. Thus, the repeated cycles of heating, expansion of the CCS, resultant spreading or collapse of the GRM structure previously contained by the CCS, results in eventual failure or significant loss of function of the CCS.

This brittleness also impacts CCSs. In particular, this brittleness critically affects the weld points between the plurality of strips. The welds are relatively weak points; thus, any negative aspect of the polymers is magnified at the welds. In addition, CCSs are usually stabilized to the GRM or other infrastructure materials by anchors, tendons, and/or wedges. Because the connection points between the CCS and the anchors, tendons, and/or wedges have high loads concentrated in a small area, failure is most likely to happen at these stress concentration points, especially under extreme conditions such as subzero temperatures or temperatures higher than about 40° C.

HDPE also has relatively poor stress cracking resistance, medium to low tear and puncture resistance, and low crack growth resistance—especially at subzero temperatures. Cracks are initiated in geotechnical applications during application and installation, and during service, especially when dynamic loads are applied. Crack growth resistance is a temperature-dependent phenomenon, wherein as temperature decreases, the material becomes more brittle and less damage tolerant. Since the brittleness increases in a "quasi-exponential" fashion as temperature drops, reinforcing articles comprising HDPE as the major constituent are subjected to catastrophic failure at subzero (° C.) temperatures. Again, failure is more likely to happen at the weld points and at the contact points between the CCS and wedges, anchors, and tendons.

Stress is also generated at the welds between the strips making up the CCS. Stress can be applied from compression when GRM is dumped onto the CCS to fill the cells. GRM can also expand when it becomes wet or when water already in the GRM freezes in cold weather. In addition, GRM has a coefficient of thermal expansion (CTE) about 5-10 times lower than the HDPE used to make the strips. Thus, the HDPE will either expand more than or shrink less than the GRM contained in the cells; this causes stress at the welds as well.

More flexible polymers, such as linear low density polyethylene (LLDPE), are better than HDPE in subzero temperature conditions. However, they have very poor creep resistance at temperatures higher than ambient, and especially higher than 40° C. Such high temperatures are expected in arid and tropic areas, but are also reached in cold areas (e.g., during the summer). Another drawback of relatively flexible polymers (such as LLDPE) is that they lack the stiffness needed when the CCS cells are still empty and humans need to walk on it during installation or during filling and compaction of GRM. If the CCS wall is too flexible, it will collapse during installation in the field, especially during the filling and condensing of GRM in the CCS cells. They also tend to creep under load, so that the connection points to anchors, tendons, and/or wedges get loose over time in elevated temperatures. This creep undermines the integrity of the CCS.

The only current working solution for cold areas are special HDPE compositions that are characterized by bimodal chain distribution, wherein one type of chain is relatively stiff and the second type of chain is relatively flexible. These polymers are made in a reactor and thus very limited in composition flexibility. If a more rubbery phase is required, it cannot be made in a reactor. These special compositions also have a relatively higher cost—usually 20-30% more than regular HDPE. Despite the advantage of two kinds of polyethylene in one resin, these resins still creep at temperatures greater than 40° C., have a CTE higher than 150 ppm/° C., and have high viscosity.

U.S. Pat. No. 3,963,799 provides compositions of polyamide and polyolefin, adapted mostly for packaging industry and methods to form alloys (compatibilized blends) thereof. The compositions described in this patent are not applicable for structural geotechnical applications including CCSs, due to its inherent brittleness, especially at low temperatures, and lack of protection against humidity and UV light. This patent does not deal with either the difficulties in welding of the compositions, or the hydrolytic instability of the polyamide phase, which may be hydrolyzed in soil, especially acidic soils.

In U.S. Pat. No. 4,346,834, different types of polyethylenes are blended to overcome the brittleness of HDPE and the low puncture resistance of LDPE and LLDPE. However, LLDPE itself does not provide adequate flexibility at low temperatures. Also, because the molecular structures of HDPE or MDPE and a more flexible polyethylene like LLDPE are different, they are immiscible and require intensive mechanical energy and adequate residence time to provide balanced physical properties. Blending in standard manufacturing equipment does not provide the morphology that is required for long-term stability when the temperature of the exposed plastic can vary from minus 70° C. to +90° C. This is a problem especially in cold areas where during autumn and winter, the temperature of exposed plastics may drop below minus 40° C., but during summer, when direct sunlight is absorbed by the CCS surface, temperatures may exceed +90° C. (especially on dark-colored surfaces). A similar approach is described in U.S. Pat. No. 6,355,733. Other drawbacks related to this mixing of two polyethylenes for geotechnical articles are the still high CTE (higher than about 150 ppm/° C.), poor heat conductivity, high creep under loads provided during thawing of water in the GRM pores, limited chemical resistance to oils and fuels (for example oilfields in Alaska and Siberia), and difficulties in high throughput extrusion of film and strips due to the low melt flow index of LLDPE.

U.S. Pat. No. 4,564,658 provides compositions of polyester and linear low density polyethylene (LLDPE) only, and provides no compatibilizer, i.e., no agent to stabilize the dispersion of the two immiscible polymers. Consequently, in extrusion applications, for example extrusion of strips for geotechnical applications, flow of the melt is uneven (melt fracturing), and segregation between phases is observed. The compositions described in this patent are not applicable for structural geotechnical applications including CCSs, due to their flexibility and creep tendency. The patent also does not provide a solution for the protection of the blend from hydrolysis in soils and landfills, oils and hydrocarbons, and from the degradation induced by heat and UV light. Welding quality is not discussed. Another drawback is that LLDPE is not flexible enough and lacks the required toughness when it reaches temperatures lower than minus 40° C.

U.S. Pat. No. 5,280,066 provides compositions of polyester, polyolefin and a functionalized styrenic elastomer for improved impact resistance, especially for injection molding. The invention is limited only to polypropylene (PP) as the polyolefin fraction. PP is too rigid and lacks the flexibility at temperatures below about 0° C., a property that is mandatory in CCSs. The compatibilizer in this patent is styrene-based and thus has limited UV light resistance, limiting the composition lifetime to about 1 to 2 years. Polyester blends, especially when not specially stabilized against hydrolysis, may fail in soils, especially those having pH greater than 7, within a relatively short period of time. Welding quality is not discussed. Another drawback is that the blend is not flexible enough and lacks the required toughness when it reaches temperatures lower than minus 40° C.

Similar compositions are described in U.S. Pat. No. 6,649,698, for improved stress cracking of films, including geomembranes. The incorporation of the more amorphous LLDPE into the HDPE resin provides crack stop mechanisms, but no solution is provided for CCS systems where strength is crucial and creep must be minimized—especially at temperatures greater than 40° C. Moreover, no solution is provided for subzero temperatures such as temperatures below minus 15° C. or minus 40° C. Since CCSs are a composite structure comprising strips and weld lines, mixing two different polyethylenes may negatively affect welding strength and long-term durability as well. A major limiting factor in a simple mixing of two polymers is that the CTE remains high and even increases, so the advantage of better rupture resistance at cold temperatures is negatively balanced by the higher CTE. Another disadvantage of blending LDPE or LLDPE with HDPE is that inferior weld strength results. It is also not straightforward to disperse the relatively viscous LLDPE in an HDPE matrix, especially by means of conventional extrusion equipment.

U.S. Pat. No. 6,875,520 provides compositions of polyamide block copolymer and a very flexible polyolefin. This invention may be useful for geomembranes but not for structural geotechnical applications including CCS. The high flexibility that is an advantage in geomembranes becomes a drawback in CCS: when load is applied on CCS supporting GRM, the composite structure of the two components interacts with the load as an integrated system. The CCS transfers the load from cell to cell by friction with the GRM which provides rigidity and stiffness. If the CCS is too flexible, the load induces a deformation of the CCS until friction with the GRM is lowered. At that specific state, the integrated system is irreversibly damaged and can no longer provide the required durability, stiffness and stabilization to the GRM. The patent does not provide a solution to the hydrolysis of the composition in soils and landfills, or when exposed to concrete or other media characterized by pH of greater than 7. UV and heat stability are not discussed or provided. The flexible blend has a CTE greater than 150 ppm/° C. and also does not provide sufficient toughness at temperatures lower than minus 40° C.

There is still a need for a geotechnical article, especially a CCS, that has excellent creep resistance, including at temperatures of about 40° C., a lower CTE, improved tear resistance, and high crack growth resistance at temperatures ranging from about minus 70° C. to about +90° C., maintains enough flexibility to enable installation and GRM filling at temperatures as low as minus 40° C., provides improved welding quality and strength compared to HDPE-based CCSs, especially under continuous loads at temperatures below minus 15° C., and provides improved resistance against UV and heat degradation. Such a CCS would be useful in cold areas of the earth.

BRIEF DESCRIPTION

The present disclosure is directed to a geotechnical article, especially a cellular confinement system (CCS), which provides a novel combination of creep resistance, puncture and tear resistance, weld strength and toughness, lowered CTE, chemical resistance against oils and fuels, improved resistance against UV light and thermal induced degradation, and stiffness at a temperature range of from about minus 70° C. to about +90° C.

In an exemplary embodiment, an improved polyolefin composition is especially useful for CCS. The polyolefin composition comprises at least two different phases, a rigid continuous phase and an elastic dispersed phase. This composition is also called a multiphase polymeric material (MPM). The MPM has high stiffness combined with good tear and puncture resistance over a temperature range of from about minus 70° C. to about +90° C. The CTE of the MPM is less than HDPE so that stress at low temperatures and the tendency to lose friction with the GRM are minimized. The rigid continuous phase provides stiffness, creep resistance, and strength—especially at temperatures above +40° C. The elastic dispersed phase provides flexibility at low temperatures, toughness, and crack resistance, so the MPM may be used in a geotechnical article or CCS at temperatures lower than minus 20° C. This morphology enables the CCS to have optimal properties, especially at the ends of the stated temperature range, without being subjected to high creep at higher temperatures or brittleness at subzero temperatures. The MPM is provided by a process that enables a wide spectrum of combination of properties, unlike reactor-made compositions.

In embodiments, the MPM comprises a rigid continuous phase and an elastic phase dispersed in the rigid continuous phase;
  wherein the rigid continuous phase comprises a rigid polymer and the elastic phase comprises an elastic polymer; and
  wherein the multiphase polymeric material has a 1% secant flexural modulus according to ASTM D790 of from about 600 MPa to about 2200 MPa at 20-25° C.;
  a creep modulus of from about 400 MPa to about 1000 MPa at 20-25° C., a load of 20% of yield stress, and a loading time of 60 minutes, according to ISO 899-1;
  a 1% secant flexural modulus according to ASTM D790 of from about 500 MPa to about 2800 MPa at minus 20° C.;
  a creep modulus of from about 500 MPa to about 1500 MPa at minus 20° C.;
  a tear strength according to ASTM D1004 of at least 20 N for a film thickness of 1 mm at 20-25° C.; and
  a tear strength according to ASTM D1004 of at least 10 N for a film thickness of 1 mm at minus 20° C.

In further embodiments, the rigid polymer has a density of greater than 0.925 g/cm$^3$ and the elastic polymer has a density of at most 0.925 g/cm$^3$.

In still further embodiments, the rigid continuous phase further comprises an engineering thermoplastic resin which is a polyester, polyamide, or polyurethane. Introducing a strong and tough polymer to the rigid phase enables an increase in the content of the elastic dispersed phase in the MPM without an increase in creep or CTE. A compatibilizer may optionally be present. The engineering thermoplastic resin may comprise up to 70% of the weight of the rigid phase. In specific embodiments, the engineering thermoplastic resin is polyethylene terephthalate (PET).

The rigid polymer can be selected from the group consisting of high density polyethylene (HDPE), medium density polyethylene (MDPE), and combinations thereof.

The elastic polymer can be selected from the group consisting of linear low density polyethylene (LLDPE); ethylene-alpha olefin elastomer or plastomer; ethylene-propylene elastomer; ethylene-propylene diene elastomer; ethylene-acrylate ester or methacrylate ester copolymers and terpolymers; butyl rubber; nitrile rubber; silicone elastomer; polyurethane elastomer; styrene block copolymers; and combinations thereof.

In other embodiments, the MPM further comprises a filler. The filler, when incorporated into the MPM, provides increased creep resistance, lower CTE, improved stiffness, improved heat conductivity, faster nucleation during manufacturing, and improved weldability, especially by ultrasonic welding means. The average particle size of the filler can be less than 50 microns or, in more specific embodiments, less than 10 microns. The filler can comprise from about 5 to about 70 weight percent of the MPM. The filler may also be surface treated. In specific embodiments, the filler is dispersed in the rigid continuous phase. In specific embodiments, the filler is a mineral filler. The filler particles can be spherical, fibrous, or flaky.

In other embodiments, the MPM further comprises a UV absorber or a hindered amine light stabilizer (HALS).

In further embodiments, the MPM further comprises a pigment and/or dye. The color may be green, brown, brown and gray (peat-like), light gray, and multi-color. The MPM might further comprise carbon black and have a black color as well.

In some embodiments, the elastic phase has a density of at most 2 g/cm$^3$.

In some additional embodiments, the elastic polymer has a glass transition temperature lower than minus 15° C., minus 45° C., or minus 55° C.

In other embodiments, the elastic polymer has a coefficient of thermal expansion of 150 ppm/° C. or less, or of less than 120 ppm/° C., of less than 100 ppm/° C.

In some embodiments, the elastic phase has an average particle size less than 10 microns, or less than 5 microns.

The multiphase polymeric material may have a notched Izod impact strength of at least 11 kJ/m$^2$ at minus 60° C. according to ASTM D256 or ISO 180.

When the MPM comprises a filler and a UV absorber, it has improved UV resistance compared to a polymeric composition comprising HDPE, a filler, and a UV absorber.

A polymeric strip formed from the MPM may have a thickness of from about 0.1 mm to about 5 mm. It may also have a width of from about 10 mm to about 5,000 mm.

In further embodiments, the polymeric strip further comprises a friction-enhancing structure selected from the group consisting of textured patterns, embossed patterns, holes, finger-like extensions, hair-like extensions, wave-like extensions, co-extruded lines, dots, mats, and combinations thereof.

In other embodiments, the strip has a plurality of layers, and at least one layer does not comprise the MPM.

Cellular confinement systems using the MPM and polymeric strips are also disclosed. In further embodiments, the distance between adjacent joints is from about 50 mm to about 1,200 mm, measured from the center of each joint. The joints may be welded by pressure-less ultrasonic means.

In still further embodiments, the ultimate weld strength of a joint having a weld width of 100 mm is greater than 1000 N when measured at ambient and greater than 1000 N when measured at minus 20° C.

In additional embodiments, the ultimate weld strength of a joint having a weld width of 100 mm is greater than 1300 N when measured at ambient and greater than 1600 N when measured at minus 20° C.

Processes for making the MPM are also disclosed. Strips, sheets, articles, cellular confinement systems, and other geotechnical articles are further disclosed. An improved welded joint is also disclosed. These and other non-limiting embodiments are described in more detail below.

DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The following detailed description is provided so as to enable a person of ordinary skill in the art to make and use the embodiments disclosed herein and sets forth the best modes contemplated of carrying out these embodiments. Various modifications, however, will remain apparent to those of ordinary skill in the art and should be considered as being within the scope of this disclosure.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Figure 1:
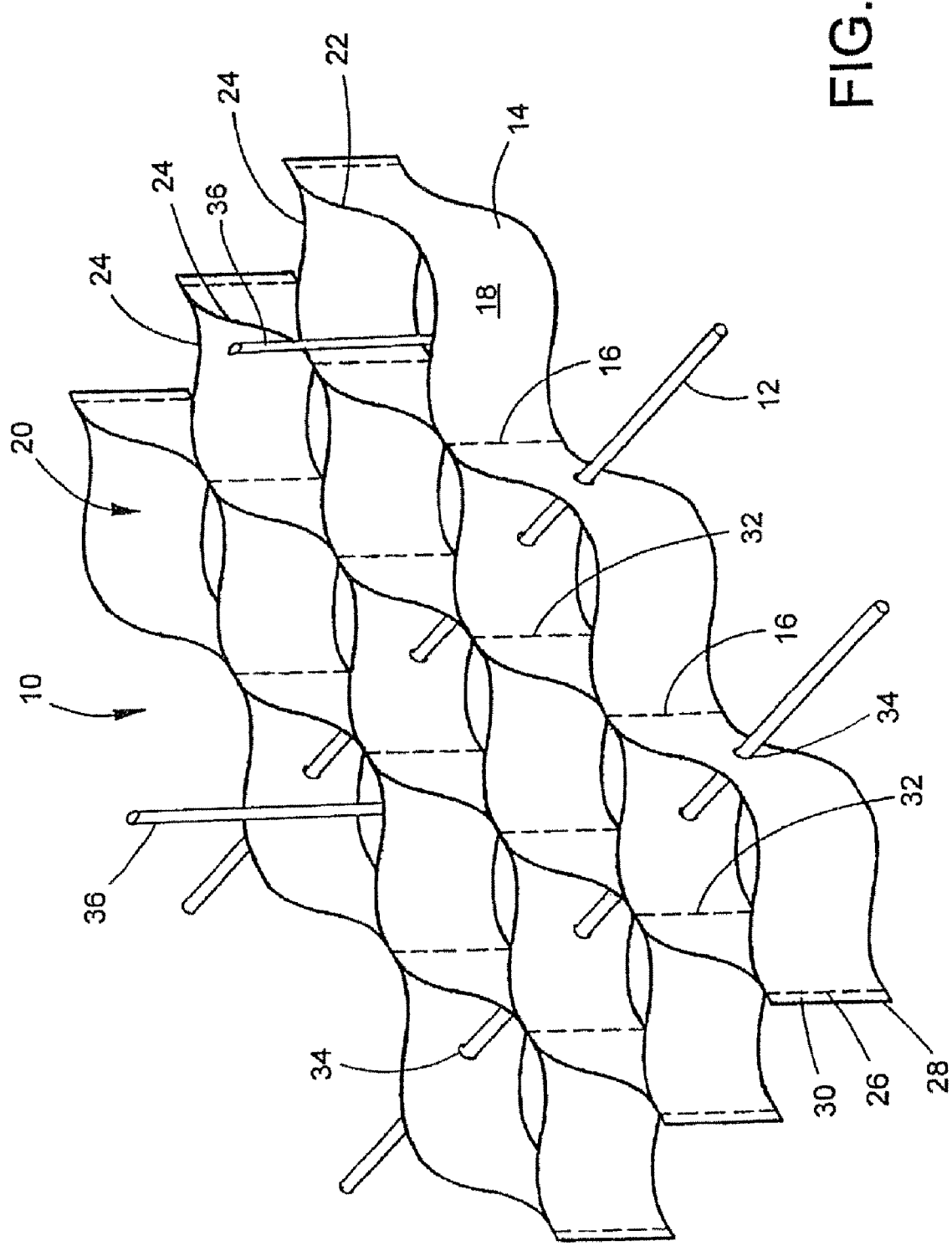
FIG. 1 is a perspective view of a single layer CCS.

FIG. 1 is a perspective view of a single layer CCS. The CCS 10 comprises a plurality of polymeric strips 14. Adjacent strips are bonded together by discrete physical joints 16. The bonding may be performing by joining, sewing or welding, but is generally done by welding. The portion of each strip between two joints 16 forms a cell wall 18 of an individual cell 20. Each cell 20 has cell walls made from two different polymeric strips. The strips 14 are bonded together to form a honeycomb pattern from the plurality of strips. For example, outside strip 22 and inside strip 24 are bonded together by physical joints 16 which are regularly spaced along the length of strips 22 and 24. A pair of inside strips 24 is bonded together by physical joints 32. Each joint 32 is between two joints 16. As a result, when the plurality of strips 14 is stretched in a direction perpendicular to the faces of the strips, the strips bend in a sinusoidal manner to form the CCS 10. At the edge of the CCS where the ends of two polymeric strips 22, 24 meet, an end weld 26 (also considered a joint) is made a short distance from the end 28 to form a short tail 30 which stabilizes the two polymeric strips 22, 24.

The CCS 10 can be reinforced and immobilized relative to the ground in at least two different ways. Apertures 34 can be formed in the polymeric strips such that the apertures share a common axis. A tendon 12 can then be extended through the apertures 34. The tendon 12 reinforces the CCS 10 and improves its stability by acting as a continuous, integrated anchoring member that prevents unwanted displacement of the CCS 10. Tendons may be used in channel and slope applications to provide additional stability against gravitational and hydrodynamic forces and may be required when an underlayer or naturally hard soil/rock prevents the use of stakes. A wedge 36 can also be used to anchor the CCS 10 to the substrate to which it is applied, e.g., to the ground. The wedge 36 is inserted into the substrate to a depth sufficient to provide an anchor. The wedge 36 can have any shape known in the art (i.e., the term "wedge" refers to function, not to shape). The tendon 12 and wedge 36 as shown are simply a section of iron or steel rebar, cut to an appropriate length. They can also be formed of a polymeric material. They can be formed from the same composition as the CCS itself. It may also be useful if the tendon 12 and/or wedge 36 has greater rigidity than the CCS 10. A sufficient number of tendons 12 and/or wedges 36 are used to reinforce/stabilize the CCS 10. It is important to note that tendons and/or wedges should always be placed against the cell wall, not against a weld. Tendons and/or wedges have high loads concentrated in a small area and because welds are relatively weak points in the CCS, placing a tendon or wedge against a weld increases the likelihood that the weld will fail.

Additional apertures 34 may also be included in the polymeric strips, as described in U.S. Pat. No. 6,296,924. These additional apertures increase frictional interlock with the GRM by up to 30%, increase root lock-up with vegetated systems as roots grow between the cells 20, improve lateral drainage through the strips to give better performance in saturated soils, and promote a healthy soil environment. Reduced installation and long-term maintenance costs may also occur. In addition, such CCSs are lighter and easier to handle compared to CCSs with solid walls.

Figure 2:
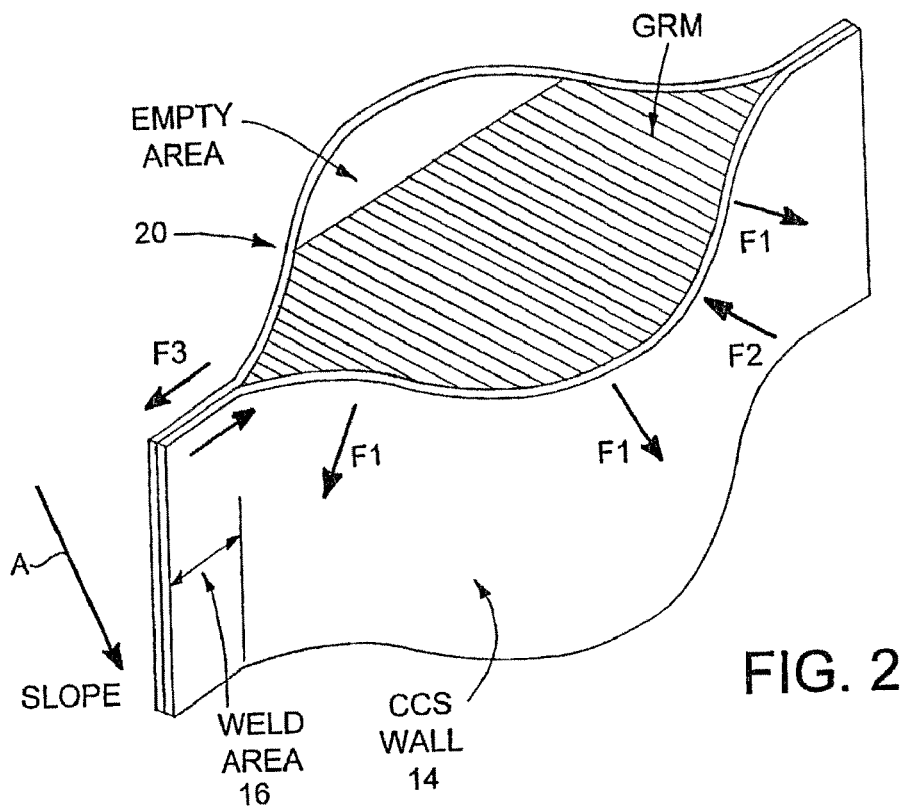
FIG. 2 is a perspective view of a cell containing a geotechnical reinforced material (GRM).

FIG. 2 is a perspective view of a single cell 20 containing a geotechnical reinforced material (GRM). The cell 20 is depicted as it might appear when the CCS is located on a slope (indicated by arrow A), so that the GRM retained within the cell 20 has settled substantially horizontally (i.e. flat relative to the earth's surface), while the cell walls 14 of the CCS 10 are substantially perpendicular to the slope A on which the CCS is located. Because the cell walls 14 are not aligned horizontally with the GRM, the GRM settles substantially on the down-slope cell wall and an "empty area" is left on the up-slope cell wall.

The cell walls 14 are subject to the forces F1 and F2. As a result of the tilting, force F1 (exerted by the weight of the GRM) and force F2 (exerted by the empty area of an adjacent down-slope cell) are not balanced. Force F1 is greater than force F2. This unbalanced force stresses the joints 16. In addition, the GRM exerts a separation force F3 against joints 16 as well. This separation force results from the mass of the GRM and natural forces. For example, the GRM will expand during humid periods as it retains water. The GRM will also expand and contract, e.g. from repeated freeze-thaw cycles of water retained within the cell 20. This shows the importance of a strong weld at each joint 16.

Figure 3:
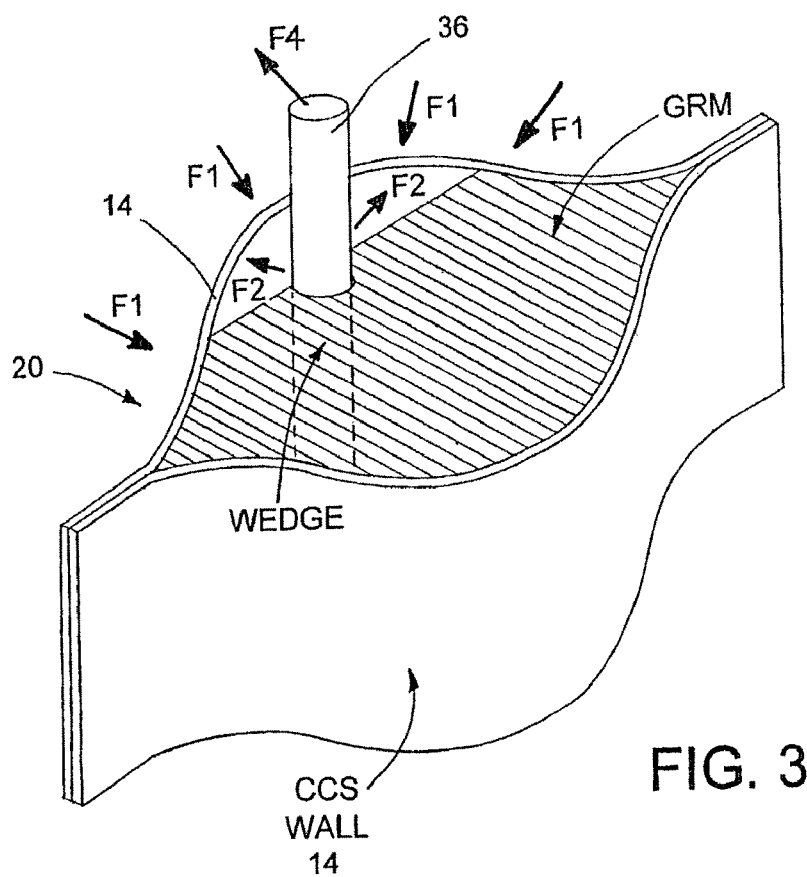
FIG. 3 is a perspective view of a cell containing a GRM and a wedge.

FIG. 3 is a perspective view of a single cell 20 containing a geotechnical reinforced material (GRM) and a wedge 36. The wedge 36 applies an additional force F4 on the up-slope cell wall to aid in balancing the forces on the cell walls 14. The additional force is applied on a localized part of the up-slope cell wall and can be detrimental to the cell wall if it is not sufficiently strong and creep-resistant.

Figure 4:
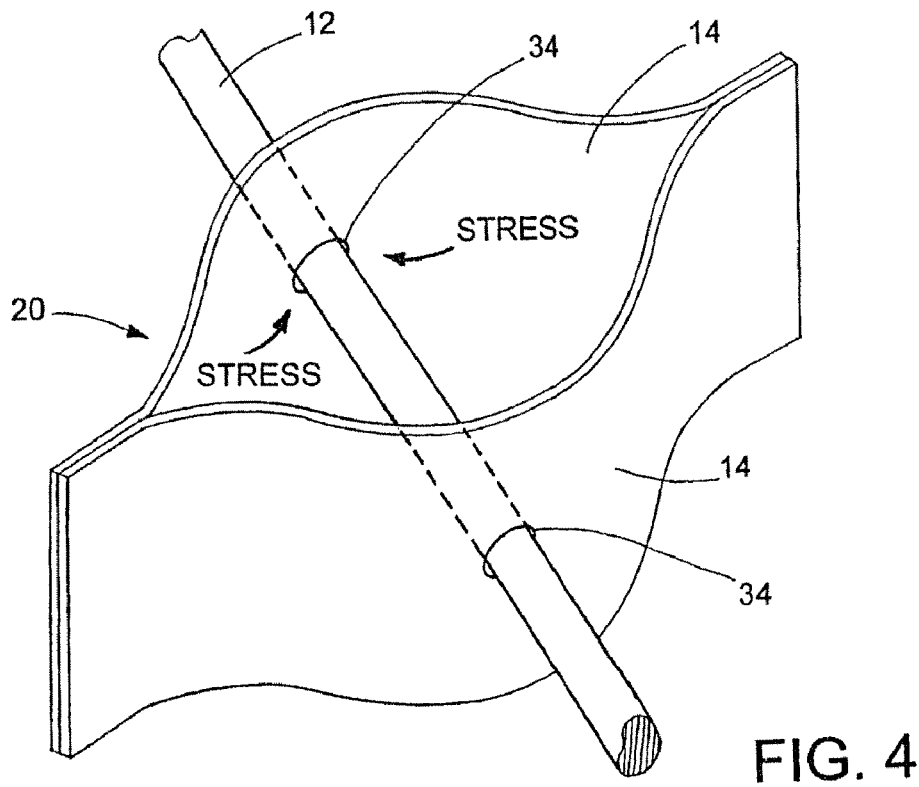
FIG. 4 is a perspective view of a cell containing a tendon.
Figure 5:
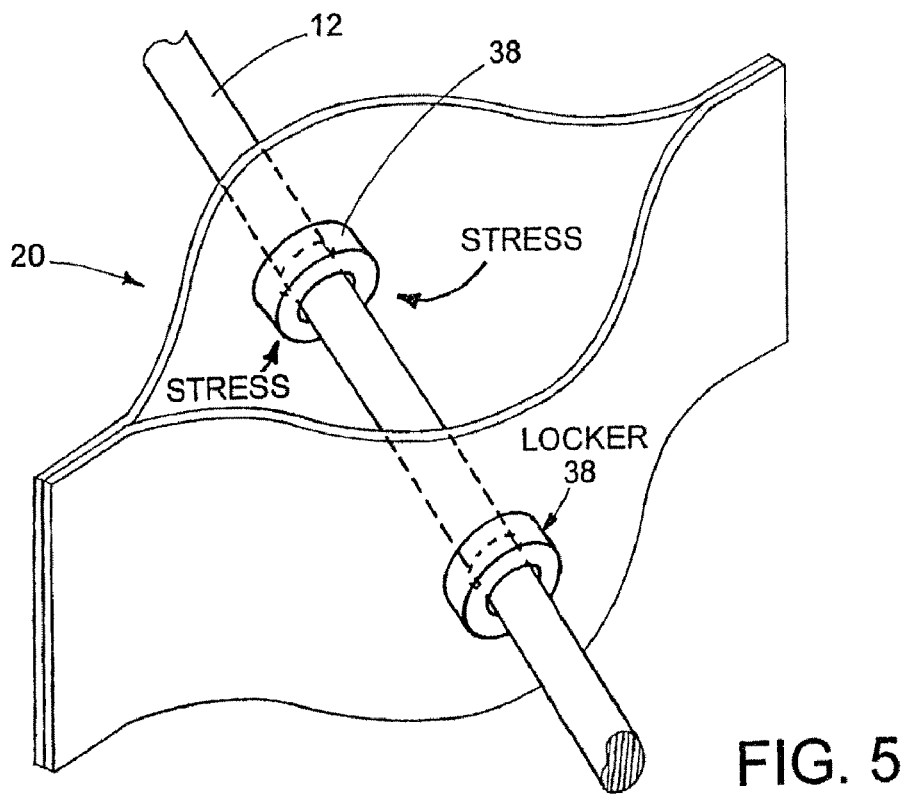
FIG. 5 is a perspective view of a cell containing a tendon and lockers.

FIGS. 4 and 5 are perspective views of a single cell 20 containing a tendon 12. As described above, the tendon 12 extends through apertures 34 in the strips 14 and is used to stabilize the CCS 10, especially in those situations where wedges 36 cannot be used. Stress is localized in the strips 14 around the apertures 34 as well. For example, the tendon 12 may have a different CTE from the strips 14. In applications where the strips 14 are provided with apertures 34 but no tendon 12 is used, GRM or water/ice can infiltrate the aperture 34 as well; expansion then increases stress and can damage the integrity of the strip 14. As shown in FIG. 5, lockers 38 can be used to spread the stress over a greater area, but the stress still exists. Use of a locker 38 provides added protection against failure in the long term.

Figure 6:
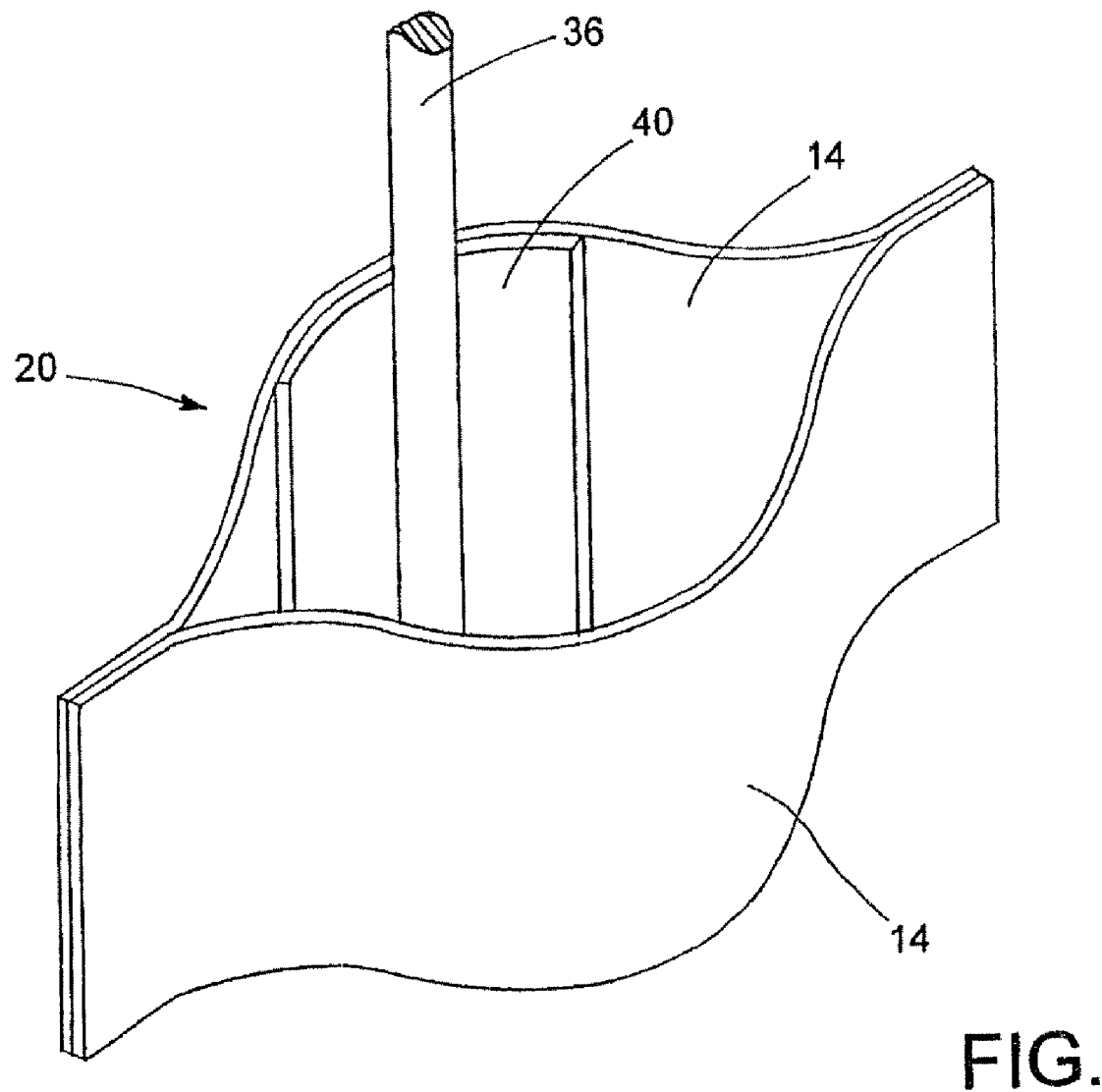
FIG. 6 is a perspective view of an exemplary embodiment of a cell including a reinforced wall portion.

FIG. 6 is a perspective view of an exemplary embodiment of a cell including a reinforced wall portion. A wedge 36 is located inside the cell 20. As discussed in reference to FIG. 3, the wedge 36 applies additional force on a localized part of the up-slope cell wall and can be detrimental to the cell wall if it is not sufficiently strong and creep-resistant. In an exemplary embodiment of the present disclosure, a reinforced wall portion 40 having a width greater than that of the wedge 36 is provided between the wedge 36 and the up-slope cell wall. Like the locker 38, the reinforced wall portion 40 spreads the stress over a greater area of the cell wall. In one embodiment, the reinforced wall portion 40 extends beyond the upper edge of the wall and is folded down over the far side of the wall, further increasing the strength of the overall wedge-contacting portion of the wall. In other embodiments, the reinforced wall portion 40 may also have an aperture 34 to accommodate the use of a tendon 12.

In one embodiment, the reinforced wall portion 40 is attached to the wall with an appropriate adhesive, e.g., a pressure-sensitive adhesive or a curable adhesive. In another embodiment, the reinforced wall portion 40 may be attached to the wall by a welding operation, particularly ultrasonic welding, or sewing, performed onsite. The reinforced wall portion 40 may be made from any suitable material. In particular embodiments, it is made from the same material as the cell wall. If desired, the reinforced wall portion 40 may also be more rigid than the wall to bear more of the stress itself.

The properties of the polyolefin compositions hereinafter described are measured at between +20 and +25° C. unless otherwise mentioned.

A multiphase polymeric material (MPM) is a polymer blend comprising at least two discrete phases, wherein a first phase is continuous, and a second phase is dispersed in the first phase. The second, dispersed, phase may have the shape of spheres, nodules, lamellas, fibrils, tubes, rods, and amoeboid shapes. Usually, good mechanical and physical properties are achieved when the second, dispersed, phase has an average diameter of from about 0.1 to about 25 microns. In more specific embodiments, the second phase has an average diameter of from about 0.1 to about 10 microns, including from about 0.1 to about 5 microns. The interface between both phases should be stable; the two phases should be covalently attached or share chains with similar chemical structure.

The morphology of a blend of two immiscible polymers will depend upon a few parameters. First, the better the compatibility between the two polymers, the finer and more stable the dispersed phase will be in the continuous phase, and the better the resulting physical properties. Second, a fluid polymer is preferred for the dispersed phase and a viscous polymer is preferred for the continuous phase. In specific embodiments, the continuous phase has a melt flow index (MFI) of about 0.1 to 30 gr/10 min at 190° C. under a load of 2.16 kg and the dispersed phase has a MFI of at least twice the MFI of the continuous phase. Third, the morphology will depend on the mechanical energy and residence time provided in making the blend. A fine dispersion is enabled by a multi-screw extruder or, more preferably, a co-rotating twin extruder. The multi-screw extruder should provide mechanical work through kneading elements or gear elements for at least 10%, or at least 20%, of its L/D. It should have a residence time of at least 10 seconds and in specific embodiments, at least 20 seconds.

ASTM D790 and its equivalent ISO 178 pertain to the flexural properties of an object. A flexural test measures the force required to bend a beam under 3-point loading conditions. The data is often used to select materials for parts that will support loads without flexing. In other words, ASTM D790 measures the stiffness of an object, such as an MPM.

ASTM D1004 pertains to initial tear resistance of plastic film or sheet. Tear resistance measures the ultimate force required to tear the film or sheet. It is often used for quality control checks or for material comparison where tear failures are possible. It is also a useful method for determining the toughness of a polymeric article.

ISO 899-1 specifies a method for determining the tensile creep of plastics in the form of standard test specimens under specified conditions such as those of pretreatment, temperature and humidity. In other words, ISO 899-1 measures the creep modulus of an object like an MPM. It can be used to compare different polymeric compositions and predict potential failure due to creep. Generally, the higher the creep modulus, the lower the tendency of the composition to creep.

A combination of (i) high stiffness and high creep modulus at temperatures greater than 40° C. and (ii) toughness and tear resistance at temperatures lower than minus 20° C. is crucial for long-term dimensional stability of a CCS. Current reactor-made polyethylene compounds do not meet these conflicting requirements. If a composition is enriched with LDPE chains, it tends to creep at temperatures greater than 40° C. However, if a composition is enriched with HDPE chains, it tends to be brittle at temperatures lower than minus 20° C. Usually polymers adapted for subzero temperatures, like LLDPE, have a creep modulus below about 100 MPa at 25° C., at a load of 20% of yield stress and loading time of 60 minutes, according to ISO 899-1. However, a CCS made solely of such material loses dimensional stability and creeps at temperatures greater than +40° C. As a result, contact between the CCS and GRM decreases, friction with the GRM decreases, and the integrity of the CCS-GRM structure is disrupted. The result is structural failure of the CCS, an unacceptable event. It is therefore impossible to combine toughness and flexibility at subzero temperatures with low creep at temperatures greater than +40° C. with only one polymer.

If an overly rigid polymer is added, like HDPE which has a 1% secant flexural modulus according to ASTM D790 of about 900 MPa, creep is lowered, but the resulting polymer is too brittle at subzero temperatures. In addition, unsuitable morphology is provided when blended by standard means; such a polymer blend is therefore unsuitable for use in cold areas. Reactor-made compositions still suffer from a creep modulus lower than that of HDPE, yet do not provide sufficient toughness at temperatures lower than minus 40° C.

Surprisingly, when rigid polymer like HDPE or MDPE and at least one elastomeric polymer are melt kneaded until a MPM structure is provided, a combination of high stiffness and high creep modulus with low temperature toughness is achieved. The rigid continuous phase provides creep resistance and dimensional stability and the elastic dispersed phase provides low temperature elasticity and toughness and crack growth resistance. The MPM structure is further improved when mineral filler is introduced, especially when it is introduced to the rigid phase. Further improvement is achieved when engineering thermoplastic, such as polyester or polyamide, and optionally a compatibilizer are introduced to either the rigid phase or to both phases at a loading of about 1 to about 50 weight percent, based on the weight of the rigid phase.

The rigid phase comprises a rigid polymer. A suitable polymer is a polyethylene polymer, such as HDPE, MDPE, and combinations thereof. The rigid polymer has density greater than 0.925 g/cm$^3$. The polyethylene polymer has good tear and puncture resistance. Tear strength and puncture resistance are important issues in perforated CCSs, wherein perforation provides drainage through the plastic wall, but weakens the strip and increases its sensitivity to tearing. Tear and puncture resistance is also important for the stage wherein the CCS is still empty before being filled with GRM and needs to survive the filling step.

The rigid phase may further comprise an engineering thermoplastic resin, usually with the assistance of a compatibilizer. The engineering thermoplastic resin may comprise from about 5 to about 50 weight percent of the rigid phase. The engineering thermoplastic resin may be selected from polyester, polyamide, and polyurethane, and copolymers and blends thereof. In a specific embodiment, the engineering thermoplastic resin is polyethylene terephthalate (PET), which is a polyester. The PET may be recycled PET, especially post consumer bottles and post industrial textile. Suitable engineering thermoplastic resins include, but are not limited to, aliphatic polyamides such as polyamide 6 like Ultramid™, manufactured by BASF, Grilon™, manufactured by EMS-Grivory, and Akulon™, manufactured by DSM; Polyamide 66, commercially available as Ultramid™, manufactured by BASF, Polynil™, manufactured by Nilit, Grilon™, manufactured by EMS-Grivory, and Akulon™, manufactured by DSM; polyamide 6-66, polyamide 6T, polyamide 6-12, polyamide 11 and Polyamide 12, commercially available as Rilsan™, manufactured by Arkema; Polyamide 46 commercially available as Stanyl™, manufactured by DSM; and Polyether block amide (PEBA), copolymers and blends thereof. The presence of engineering thermoplastic resin in the rigid phase improves the MPM resistance against oils, fuels and hydrocarbons. It also significantly improves the creep modulus, usually by at least 20%; the improvement is even greater compared to HDPE at temperatures greater than 40° C. It also lowers the CTE so the CCS is subjected to less dimensional change during thermal cycling. In specific embodiments, the MPM has a CTE lower than about 150 ppm/° C. and in further embodiments, lower than about 120 ppm/° C.

The compatibilizer is any polymer or oligomer capable of stabilizing a dispersion of two immiscible polymers. Most preferred are polymers or oligomers containing an average of at least one active group per chain, said active group selected from anhydride, carboxyl, amide, ester, oxirane, mercaptan, isocyanate, methylol, oxazoline, amine, vinyl, allyl and blocked isocyanate.

In one embodiment, the rigid phase comprises 50 to 100% HDPE or MDPE; up to 70% filler, fibers or whiskers; up to 50% engineering thermoplastic resin; and up to 50% compatibilizer.

The elastic dispersed phase comprises at least one elastomeric polymer. The polymer usually has an elastic modulus lower than 500 MPa, and more preferably lower than 300 MPa at 25° C. Suitable elastomeric polymers include, but are not limited to, linear low density polyethylene (LLDPE) (for example Attane™ and Dowlex™ manufactured by DOW, Petrothene™ manufactured by Equistar, and Exceed™ manufactured by ExxonMobil); ethylene-alpha olefin elastomer (for example Engage™ manufactured by DOW, Exact™ manufactured by ExxonMobil, and Tafiner™ and Evolue™ manufactured by Mitsui); ethylene-propylene elastomer or ethylene-propylene diene elastomers (for example Vistalon™ manufactured by ExxonMobil and Nordel™ manufactured by DOW); ethylene-acrylate ester or methacrylate ester copolymers and terpolymers (for example Elvaloy™ manufactured by DuPont and Lotryl™ manufactured by Arkema); butyl rubber; nitrile rubber; silicone elastomer; polyurethane elastomer; styrene block copolymers (for example Kraton™ manufactured by Kraton); and combinations thereof. The elastic polymer may have a density of at most 0.925 g/cm$^3$.

A compatibilizer may be used to stabilize the components of the MPM, including the rigid polymer, the engineering thermoplastic resin, and/or the elastomeric polymer. The compatibilizer provides better compatibility between the two phases by interacting with both phases in their interface, lowering the enthalpy of mixing, and encapsulating the dispersed phase.

In further embodiments, a filler is dispersed in the MPM. The filler improves vertical stiffness (crucial for installation), thermal conductivity, and creep resistance. It also lowers the CTE and improves the speed of weld formation. If the filler has a dark color, it can also absorb harmful UV light and protect the MPM from degradation. All of these benefits are achieved without sacrificing the elasticity of the elastic dispersed phase and without affecting its glass transition temperature (Tg). The filler may comprise from about 5 to about 70 weight percent of the MPM, based on the total weight of the MPM. In further embodiments, the filler comprises from about 10 to about 50 weight percent of the MPM or from about 20 to about 40 weight percent of the MPM, based on the total weight of the MPM. The dispersion of the filler has a significant effect on the properties of the MPM, so the MPM is preferably made with an extruder comprising two or more screws, especially a co-rotating twin screw extruder.

The filler may have an average particle diameter lower than 50 microns, more preferably lower than 30 microns, and most preferably lower than 10 microns. The filler can be selected from, among others, mineral fillers, metal oxides, metal carbonates, metal sulfates, metal phosphates, metal silicates, metal borates, metal hydroxides, silica, silicates, aluminates, alumo-silicates, chalk, talc, dolomite, fibers, whiskers, wollastonite, clay, kaolin, industrial ash, concrete powder and cement, dolomite, natural fibers such as kenaf, hemp, flax, ramie, sisal, newsprint fibers, paper mill sludge, sawdust, wood flour, carbon, aramid, or any mixtures thereof. Preferably, the filler is a mineral filler in the form of fibers or whiskers.

Examples of commercially available filler suitable for the MPM of the present disclosure are Blank-Fixe™ manufactured by Sachtleben; Lokalit™ and Yotalk™ manufactured by Yokal; Sillitin™ and Aktisil™ manufactured by Hoffmann Mineral; and STARFIL PH™ and MINSPAR™ manufactured by Kentucky-Tennessee Clay Company. In a specific embodiment, the filler is selected from silica, silicates, alumo-silicates, chalk, talc, dolomite, wollastonite, kaolin, clay, and industrial ash.

The filler may be surface treated for better compatibility with the MPM. In specific embodiments, the surface treatment is selected from organic acid, organic esters, organic amides, organo-silanes, organo-titanates and organo-zirconates.

The filler can be dispersed in the rigid continuous phase and/or the elastic dispersed phase of the MPM. In specific embodiments, the filler is dispersed in the rigid continuous phase of the MPM. The filler provides lower CTE and more stiffness and creep resistance without sacrificing cold temperature toughness, impact resistance, and/or puncture resistance.

Another advantage related to a MPM comprising filler is improved heat conductivity. Improved heat conductivity lowers the temperature buildup in the MPM and the resulting CCS product in field use. The result is improved durability against thermal and UV light induced degradation. This advantage occurs especially when the CCS is used along with wedges, especially metal wedges (see, for example, FIG. 3).

Surprisingly, when the filler has an average particle size lower than 10 microns, the low temperature properties of the MPM remain unchanged, including tear resistance, impact resistance, flexibility as well as puncture resistance. The filler, especially when it has an average diameter of below 6 microns, appears to promote nucleation of both phases, so that production throughput is increased and strength increases. Since the filler increases stiffness of the rigid phase by increasing crystallinity and providing reinforcement, the CCS has improved creep resistance at ambient temperatures and at temperatures in the range of 40 to 70° C., as well as excellent low temperature toughness. Since the dispersed elastic phase is more amorphous than the rigid phase, usually having a crystallinity level lower than 30% and sometimes lower than 20%, its elasticity and ductility are changed only slightly by the filler.

The MPM may further comprise additives selected from organic UV absorbers, especially benzotriazoles and benzophenones; inorganic UV absorbers, especially titanium dioxide, zinc oxide and carbon black, including nano-size inorganic UV absorbers; and heat stabilizers, especially hindered amine light stabilizers (HALS). These additives help protect the MPM and articles made from the MPM against degradation in the field for up to 100 years.

In addition, it has been surprisingly found that when the MPM comprises filler and a UV absorber, there is a synergistic effect.

The UV absorber and/or HALS has a lower tendency to evaporate, extract or hydrolyze relative to a HDPE based composition because of the lower diffusion rate created by the presence of filler, especially nanoparticle filler or flaky particles such as kaolin, talc and clays. The effect is also enhanced when engineering thermoplastic resin is introduced to the rigid phase. Another positive effect of the filler is lower heat buildup in the article, due to improved heat conductivity, thus lowering the rate of degradation. In a specific embodiment, zinc oxide filler is used. The zinc oxide filler has high absorption of UV light and thus efficient protection.

The MPM may further comprise pigments and/or dyes so that the MPM can match the color of the GRM. Generally, the color is other than black or dark gray, especially any color which is not in the gray scale. The MPM need not be a uniform color; patterns of color (such as camouflage) are also contemplated. A preferred group of colors and shades are brown (soil-like), brown and gray (peat-like), off-white (aggregate like), light gray (concrete-like), green (grass-like), and a multi-color look which is stained, spotted, grained, dotted or marble-like. Such colors have the utilitarian feature of allowing the CCS to be used in applications where the CCS is visible (i.e. not buried or covered by fill material). For example, the CCS can be used in terraces where the outer layers are visible, but can be colored to blend in with the environment.

In a specific embodiment, the MPM has a 1% secant flexural modulus according to ASTM D790 of at most 2200 MPa; a density of at most 1.4 g/cm$^3$; and a tear strength according to ASTM D1004 of at least 20 N for a film thickness of 1 mm.

In another specific embodiment, the MPM has a 1% secant flexural modulus according to ASTM D790 of at most 2800 MPa; a density of at most 2.5 g/cm$^3$; and a tear strength according to ASTM D1004 of at least 10 N for a film thickness of 1 mm. The rigid continuous phase comprises up to 99% polyolefin having a density of greater than 0.925 g/cm$^3$ and the elastic dispersed phase comprises up to 99% polyolefin having a density of at most 0.925 g/cm$^3$.

In another specific embodiment, the MPM comprises a rigid continuous phase and an elastic dispersed phase. The continuous phase comprises a polymer selected from HDPE, MDPE, and combinations thereof. The continuous phase may also comprise up to 70 weight percent mineral filler. The continuous phase has a 1% secant flexural modulus according to ASTM D790 of at most 1800 MPa; a density of at most 2.5 g/cm$^3$; and a creep modulus of at least 400 MPa at 25° C., a load of 20% of yield stress, and a loading time of 60 minutes, according to ISO 899-1. The elastic dispersed phase comprises an elastomer selected from linear low density polyethylene (LLDPE); ethylene-alpha olefin elastomer or plastomer; ethylene-propylene elastomer; ethylene-propylene diene elastomer; ethylene-acrylate ester or methacrylate ester copolymers and terpolymers; butyl rubber; nitrile rubber; silicone elastomer; polyurethane elastomer; styrene block copolymers; and combinations thereof. The elastic dispersed phase has a 1% secant flexural modulus according to ASTM D790 of at most 500 MPa; a density of at most 2 g/cm$^3$; and a glass transition temperature lower than minus 15° C.

In another specific embodiment, the MPM comprises a rigid continuous phase and an elastic dispersed phase. The continuous phase comprises up to 100% HDPE or MDPE; up to 50% mineral filler; and up to 50% engineering thermoplastic resin. The continuous phase may further comprise a compatibilizer. The continuous phase has a density of from greater than 0.925 g/cm$^3$ to about 2.5 g/cm$^3$; a 1%/secant flexural modulus according to ASTM D790 of from about 600 to about 2800 MPa; and a creep modulus according to ISO 899-1 of from about 150 to about 1500 MPa at 25° C. The dispersed phase comprises up to 100% of LLDPE or ethylene copolymer or terpolymer; up to 50% mineral filler; and up to 100% elastomer. The elastomer is selected from ethylene-alpha olefin elastomer; ethylene-propylene elastomer; ethylene-propylene diene elastomer; ethylene-acrylate ester or methacrylate ester copolymers and terpolymers; butyl rubber; nitrile rubber; silicone elastomer; polyurethane elastomer; styrene block copolymers; and combinations thereof. The dispersed phase has a 1% secant flexural modulus according to ASTM D790 of from about 50 to about 450 MPa.

In another specific embodiment, the MPM comprises from about 1 to about 99 weight percent of the rigid continuous phase and from about 1 to about 99 weight percent of the elastic dispersed phase. The MPM has a 1% secant flexural modulus according to ASTM D790 of at most 1800 MPa; a density of at most 2.5 g/cm$^3$; and a creep modulus of at least 200 MPa at 25° C., a load of 20% of yield stress, and a loading time of 60 minutes, according to ISO 899-1.

In further embodiments, the resulting MPM has a coefficient of thermal expansion (CTE) of 150 ppm/° C. or lower.

For comparison, the following values are provided:

A. HDPE has a 1% secant flexural modulus according to ASTM D790 of about 900-1100 MPa and a creep modulus of about 400-600 MPa at 25° C., a load of 20% of yield stress, and a loading time of 60 minutes, according to ISO 899-1.

B. MDPE has a 1% secant flexural modulus according to ASTM D790 of about 450-850 MPa and a creep modulus of about 250-500 MPa at 25° C., a load of 20% of yield stress, and a loading time of 60 minutes, according to ISO 899-1.

C. LLDPE has a 10% secant flexural modulus according to ASTM D790 of about 220-380 MPa and a creep modulus of about 150-200 MPa at 25° C., a load of 20% of yield stress, and a loading time of 60 minutes, according to ISO 899-1.

In further embodiments, the MPM has a notched Izod impact strength of at least 11 kJ/m$^2$ at minus 60° C. according to ASTM D256 or ISO 180.

The MPM can be made by a process comprising the following steps:

a) providing rigid phase and elastic phase polymers to a multi-screw extruder;

b) melting polymers by means of melt kneading to form a molten polymer;

c) optionally, providing filler into the molten polymer;

d) melt kneading the polymer and optionally the filler to form an MPM compound wherein the average diameter of the dispersed phase is less than 30 microns;

e) optionally deagglomerating and dispersing the filler;

f) pumping the MPM compound out of the extruder; and g) optionally extruding the MPM to a sheet or profiles or granules or powder of flakes or pellets.

The rigid continuous phase and elastic dispersed phase polymers can be mixed in a multi-screw extruder. However, a single screw extruder can be used if special mixing elements are provided. If mineral filler is provided, it should be premixed with polymer and fed as a masterbatch. The properties of the MPM blend are very dependent on the mixing method. Usually, a single screw extruder fails to provide sufficient residence time and kneading to reduce the dispersed phase to an optimal size and/or to deagglomerate the filler. In a specific embodiment, at least two polymers (which will become the rigid continuous phase and the elastic dispersed phase) and optionally filler are melt kneaded in a multi-screw extruder until fine dispersion of the dispersed phase polymer is achieved. Usually, a blend mixed in a single screw extruder is inferior in puncture and tear resistance, elongation to break and fatigue properties.

The multi-screw extruder is preferably an intermeshing extruder, more specifically a co-rotating twin screw extruder. In a specific embodiment, the extruder screws comprise at least one melting zone, at least one kneading zone, optionally at least one reverse element, at least one vent or degassing port, and at least one conveying zone. The filler is preferably provided into the extruder by means of a top or side feeder. Humidity and air can be removed by a vent located adjacent to the filler side feeder.

The introduction of mineral fillers to the polymeric layer also improves the manufacturing quality of the layer. Such fillers lower heat buildup by reducing torque during melt kneading, extruding and molding. This is especially important during melt kneading, which is a heat-generating process that can degrade the polymer. Surprisingly, when filler is introduced, less mechanical energy is required for melt kneading of a mass unit of compound relative to unfilled HDPE or MDPE, and thus the relative throughput increases and heat buildup in this compound along the extruder decreases. Moreover, resistance to shear during compounding and extrusion is lower than with HDPE. As a result, fewer gels are created and less degradation of the polymer occurs. This enables production of thinner strips under the same torque of the extruder and thus increased throughput rate, as measured by unit length per unit time. This advantage is very important when the polymer has a MFI lower than about 0.2 gr/10 minutes at 190° C. under a load of 2.16 kg, since the high viscosity of the polymers limits the manufacturing rate and prevents the production of thin polymeric strips.

The MPM compound can be produced in a one-step process wherein the rigid continuous phase and elastic dispersed phase polymers are fed to a first aperture (hopper) of the extruder, melt kneaded, and the filler is fed from a second aperture in the extruder to the melt, usually by means of a side feeder. Entrapped air and adsorbed humidity may be removed by means of an atmospheric vent. The mixture is further melt kneaded until most agglomerates are deagglomerated and the filler is dispersed evenly in the polymer blend. Entrapped volatiles as well as byproducts are optionally removed by an optional vacuum vent. The resulting MPM compound can then be pumped through a die to form pellets, flakes, granules, powder, beads, spheres, profiles, or a sheet.

In a two-step process, the pellets, flakes, granules or powder may be later provided to a second extruder for re-melting and extruding a profile or sheet. Alternatively, the MPM compound can also be pumped as melt directly to a second extruder, without cooling and pelletizing.

Polymeric profiles, strips, or sheets made from the MPM can be formed by extrusion or molding. A polymeric strip may have a total thickness of from about 0.1 mm to about 5 mm and/or a total width of from about 10 mm to about 5,000 mm.

The polymeric strip may further comprise friction-enhancing integral structures. The increased friction decreases movement of the polymeric strip relative to the GRM it supports. These friction-enhancing structures are generally formed by embossing. The structures may comprise a pattern selected from the group consisting of textured patterns, embossed patterns, holes, finger-like extensions, hair-like extensions, wave-like extensions, co-extruded lines, dots, mats, and combinations thereof.

A multilayer polymeric strip may also be formed, wherein at least one layer comprises a MPM. In a specific embodiment, one layer is a MPM and a second layer is a polyolefin.

The polymeric strips made from the MPM of the present disclosure have improved welding strength and durability. The strength of the welds is at least 10% greater compared to a polymeric strip consisting of virgin HDPE or MDPE when measured at temperatures of minus 20° C. or lower. When welded strips are subjected to long term loading at subzero temperatures, their failure rate is at least 10% lower compared to welded strips consisting of virgin HDPE or MDPE. This weld strength holds as well at subzero temperatures such as minus 20° C. or minus 40° C. and as low as minus 60° C. This improved weldability is mostly significant when ultrasonic welding is used because polyethylene, especially low density grades of polyethylene, is relatively difficult to weld by ultrasonic welding due to its low density, low crystallinity content, and low coefficient of friction. The properties of HDPE at subzero temperatures are insufficient for applications in cold areas. At temperatures lower than minus 20° C., welds between polymeric strips consisting solely of HDPE or MDPE suffer catastrophic failure relatively easily.

The welding strength of a multi-component material is usually inferior to that of a single-component material. The welding strength of HDPE, for example, is much higher than the welding strength of HDPE mixed with other lower density polyethylenes in a typical single screw sheet extruder, when measured at ambient. The strength difference is even more pronounced when elastomers are mixed.

Surprisingly, a MPM of the present disclosure, especially one comprising a mineral filler, has a welding strength which is equal or better than that of HDPE when measured at ambient, and a welding strength which is significantly better at temperatures lower than minus 20° C. The higher the viscosity (higher molecular weight) of the dispersed phase, the more difficult it is to disperse, but the higher the weld strength of the welded MPM. The MPM is therefore suitable for use at subzero temperatures. The improvement is in the speed with which the surface is melted, the speed with which the surface recovers its strength, the final weld strength and its load bearing capabilities for prolonged periods.

Without being bound by theory, the improved weldability appears to be synergistic. The rigid phase, characterized by high modulus of elasticity and low acoustic damping, i.e., creep modulus, loss modulus, and dissipation factor, responds quickly to the ultrasonic vibrations and heats up the elastomeric phase, which typically has a lower melting point, so that the weld is formed faster than when HDPE alone is welded. The presence of filler, especially in the rigid phase, increases its modulus of elasticity, coefficient of friction and the velocity of sound in the phase. During a subsequent cooling step, the rigid phase crystallizes faster than the elastomeric phase, so that a shorter cycle time is provided. During the cooling step, the filler serves as nucleating agent. The presence of filler improves the nucleation rate of both phases, so that the resulting weld becomes strong and durable much faster relative to un-filled HDPE or MDPE.

A three-dimensional cellular confinement system is formed from a plurality of polymeric strips. Generally, a CCS has two forms. The CCS is generally stored or transported in an "as molded" form, wherein the polymeric strips are stacked or flattened so that cells are not present. The CCS is then converted to an "on field" form by expanding the CCS so that cells are present. The "as molded" form is not shown; the "on field" form can be seen in FIG. 1. As seen in FIG. 1, generally each strip appears to have a wave-like pattern with peaks and valleys. The peaks of one strip are joined to the valleys of another strip so that a honeycomb-like pattern is formed. In other words, the strips are stacked parallel to each other and interconnected by a plurality of discrete physical joints, the joints being spaced apart from each other by non-joined portions. The joints may be formed by welding, bonding, sewing or any combination thereof. In specific embodiments, the joints are welded by ultrasonic means. In other embodiments, the joints are welded by pressure-less ultrasonic means. In embodiments, the distance between adjacent joints is from about 50 mm to about 1,200 mm, measured from the center of each joint.

In a specific embodiment, the ultimate weld strength of each joint is greater than 1000 N for a weld width of 100 mm when measured at ambient. In another specific embodiment, the ultimate weld strength of each joint is greater than 1300 N for a weld width of 100 mm when measured at ambient. In another specific embodiment, the ultimate weld strength of each joint is greater than 2000 N for a weld width of 100 mm when measured at ambient.

In another specific embodiment, the ultimate weld strength of each joint is greater than 1000 N for a weld width of 100 mm when measured at minus 20° C. In another specific embodiment, the ultimate weld strength of each joint is greater than 1600 N for a weld width of 100 mm when measured at minus 20° C.

For comparison, HDPE and MDPE have ultimate weld strengths of 1200-1800 N when measured at ambient. However, at subzero temperatures, their ultimate weld strength will vary from these starting weld strengths down to almost zero as they become brittle. The MPM of the present disclosure has, in some compositions, a slightly reduced weld strength at ambient, but maintains its weld strength at subzero temperatures because it does not become brittle. When the rigid phase of the MPM comprises engineering thermoplastic resin, the weld strength is equal to or higher than the strength of HDPE when measured at ambient. When the rigid phase comprises only HDPE or MDPE, the weld strength is about 10% lower than the strength of HDPE when measured at ambient.

In another specific embodiment, the ultimate weld strength of the MPM polymeric strips is at least 75%, including at least 85%, and more specifically at least 10% higher than the welding strength of strips comprising only HDPE or MDPE when measured at 20-25 Celsius. The term 'about' refers hereinafter to a tolerance of +20% of the defined measure. Again, it is emphasized that the MPM has a slightly reduced weld strength at ambient when it comprises only HDPE or MDPE, but maintains its weld strength at subzero temperatures because it does not become brittle.

The present disclosure will further be illustrated in the following non-limiting working examples, it being understood that these examples are intended to be illustrative only and that the disclosure is not intended to be limited to the materials, conditions, process parameters and the like recited herein. All proportions are by weight unless otherwise indicated.

EXAMPLES

Example 1

A MPM composition was made comprising 70-90 weight percent Marlex® K306 MDPE (manufactured by Chevron Philips) having a density of 0.937 g/cm$^3$, 5-40 weight percent Marlex® 7104 LLDPE (manufactured by Chevron Philips) having a density of 0.918 g/cm$^3$, 0-25 weight percent Engage® 8100 metallocene plastomer (manufactured by DOW), and up to 30% calcium carbonate or talc filler having an average particle size of less than 10 microns. The ingredients were melt kneaded in a co-rotating twin screw extruder characterized by L/D ratio of about 40, equipped with at least one side feeder for the filler, one atmospheric vent and one vacuum vent for degassing. The resulting MPM compound was pelletized. The pellets were dried and re-melted in a second single screw extruder at a melt temperature of about 160-280° C. and pumped through a die to form a sheet. The sheet was cooled between metal chilling rolls. Two formulations made according to this procedure are described in Table 1 as Formulas 1 and 2, respectively.

Example 2

A MPM composition was made comprising 50-80 weight percent SABIC® HDPE B5411 (manufactured by Sabic) having density of 0.954 g/cm$^3$, 0-40 weight percent Marlex® 7104 LLDPE (manufactured by Chevron Philips) having density of 0.918 g/cm$^3$, 5-40 weight percent Exact® 201 plastomer (manufactured by ExxonMobil) having density of 0.902 g/cm$^3$, 0-20 weight percent PET dry regrind, about 10 weight percent maleated polyethylene (Bondyram™ 5001 manufactured by Polyram), and 0-40 weight percent calcium carbonate or talc filler having an average particle size of less than 10 microns. The ingredients were melt kneaded in a co-rotating twin screw extruder characterized by L/D ratio of about 40, equipped with at least one side feeder for the filler, one atmospheric vent and one vacuum vent for degassing. The resulting MPM compound was pelletized. The pellets were dried and re-melted in a second single screw extruder at a melt temperature of about 160-280° C. and pumped through a die to form a sheet. The sheet was cooled between metal chilling rolls. Two formulations made according to this procedure are described in Table 1 as Formulas 3 and 4, respectively.

TABLE 1

MPM Compositions

| Formula name | MDPE (Kg) | LLDPE (Kg) | Plastomer (Kg) | CaCO$_3$ (kg) | PET (Kg) | BONDYRAM (Kg) |
|---|---|---|---|---|---|---|
| 1 | 7 | 2 | 0 | 1 | 0 | 0 |
| 2 | 7 | 1 | 1 | 1 | 0 | 0 |
| 3 | 5 | 2 | 0 | 1 | 1 | 1 |
| 4 | 5 | 0 | 2 | 0 | 2 | 1 |

Evaluation

The MPM sheet according to Formula 1 had a 1% secant flexural modulus according to ASTM D790 of about 810 MPa, a tear strength according to ASTM D1004 of about 28 N for a film thickness of 1 mm, and a creep modulus of about 520 MPa at 25° C., a load of 20% of yield stress, and a loading time of 60 minutes, according to ISO 899-1. The creep modulus at minus 40° C. was 770 MPa.

The MPM sheet according to Formula 2 had a 1% secant flexural modulus according to ASTM D790 of about 690 MPa, a tear strength according to ASTM D1004 of about 35 N for a film thickness of 1 mm, and a creep modulus of about 440 MPa at 25° C., a load of 20% of yield stress, and a loading time of 60 minutes, according to ISO 899-1. The creep modulus at minus 40° C. was 660 MPa.

Two strips, 100 mm width each, were ultrasonically welded at 20 MHz. This procedure was repeated to obtain 10 couples. The weld strength of each couple was measured 48 hours after welding and averaged. The average weld strength of Formula 1 was in the range of 1600-2000 N at 20-25° C. and 1400-2000 N at minus 20° C. The average weld strength of Formula 1 was in the range of 1200-1750 N at 20-25° C. and 1400-1800 N at minus 20° C.

Two strips, 100 mm width each, were ultrasonically welded at 20 MHz. This procedure was repeated to obtain 10 couples. Each welded couple was loaded with 88 kg weight for 2 weeks at 20-25 Celsius and for two weeks at minus 20° C. All ten couples of Formulas 1 and 2 survived intact at both temperatures.

The MPM sheet according to Formula 3 had a 1% secant flexural modulus according to ASTM D790 of about 960 MPa, a tear strength according to ASTM D1004 of about 22 N for a film thickness of 1 mm, and a creep modulus of about 620 MPa at 25° C., a load of 20% of yield stress, and a loading time of 60 minutes, according to ISO 899-1. The creep modulus at minus 40° C. was 880 MPa.

The MPM sheet according to Formula 4 had a 1% secant flexural modulus according to ASTM D790 of about 990 MPa, a tear strength according to ASTM D1004 of about 35 N for a film thickness of 1 mm, and a creep modulus of about 740 MPa at 25° C., a load of 20% of yield stress, and a loading time of 60 minutes, according to ISO 899-1. The creep modulus at minus 40° C. was 860 MPa.

Two strips, 100 mm width each, were ultrasonically welded at 20 MHz. This procedure was repeated to obtain 10 couples. The weld strength of each couple was measured 48 hours after welding and averaged. The average weld strength of Formula 3 was in the range of 1600-2200 N at 20-25° C. and 1400-1900 N at minus 20° C. The average weld strength of Formula 4 was in the range of 1400-2350 N at 20-25° C. and 1400-2400 N at minus 20° C.

Two strips, 100 mm width each, were ultrasonically welded at 20 MHz. This procedure was repeated to obtain 10 couples. Each welded couple was loaded with 88 kg weight for 2 weeks at 20-25° C. and for two weeks at minus 20° C. All ten couples of Formulas 3 and 4 survived intact at both temperatures.

For comparison, welded strips of the same width and thickness were made from Marlex® K306 MDPE and tested under the same conditions. Their failure rate was about 50% after 30 days under 88 kg.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A multiphase polymeric material which maintains stiffness and creep resistance over a temperature range of minus 70° C. to plus 90° C.,
the multiphase polymeric material comprising a rigid continuous phase and an elastic phase dispersed in the rigid continuous phase;
wherein the rigid continuous phase comprises two separate polymers, (i) a rigid polymer having a density of greater than 0.925 g/cm$^3$ and (ii) an engineering thermoplastic resin selected from the group consisting of polyamides and polyurethanes;
wherein the elastic phase comprises an elastic polymer having a density of at most 0.925 g/cm$^3$; and
wherein the multiphase polymeric material has a 1% secant flexural modulus according to ASTM D790 of from about 600 MPa to about 2200 MPa at 20-25° C.;
a creep modulus of from about 400 MPa to about 1000 MPa at 20-25° C., a load of 20% of yield stress, and a loading time of 60 minutes, according to ISO 899-1;
a 1 % secant flexural modulus according to ASTM D790 of from about 500 MPa to about 2800 MPa at minus 20° C.;
a creep modulus of from about 500 MPa to about 1500 MPa at minus 20° C.;
a tear strength according to ASTM D1004 of at least 20 N for a film thickness of 1 mm at 20-25° C.; and
a tear strength according to ASTM D1004 of at least 10 N for a film thickness of 1 mm at minus 20° C.

2. The multiphase polymeric material of claim 1, wherein the engineering thermoplastic resin comprises up to 70% of the weight of the rigid phase.

3. The multiphase polymeric material of claim 1, wherein the rigid polymer is selected from the group consisting of high density polyethylene (HDPE), medium density polyethylene (MDPE), and combinations thereof.

4. The multiphase polymeric material of claim 1, wherein the elastic polymer is selected from the group consisting of linear low density polyethylene (LLDPE); ethylene-alpha olefin elastomer or plastomer; ethylene-propylene elastomer; ethylene-propylene diene elastomer; ethylene-acrylate ester or methacrylate ester copolymers and terpolymers; butyl rubber; nitrile rubber; silicone elastomer; polyurethane elastomer; styrene block copolymers; and combinations thereof.

5. The multiphase polymeric material of claim 1, wherein the rigid continuous phase or the elastic phase further comprises a filler in the form of fibers or whiskers.

6. The multiphase polymeric material of claim 5, wherein the filler is selected from the group consisting of mineral fillers, metal oxides, metal carbonates, metal sulfates, metal phosphates, metal silicates, metal borates, metal hydroxides, silica, silicates, aluminates, alumo-silicates, chalk, talc, dolomite, fibers, whiskers, wollastonite, clay, kaolin, industrial ash, concrete powder and cement, dolomite, natural fibers, newsprint, paper mill sludge, sawdust, wood flour, carbon, aramid, and mixtures thereof.

7. The multiphase polymeric material of claim 5, wherein the average particle size of the filler is less than 50 microns.

8. The multiphase polymeric material of claim 5, wherein the average particle size of the filler is less than 10 microns.

9. The multiphase polymeric material of claim 5, wherein the filler comprises from about 5 to about 70 weight percent of the multiphase polymeric material.

10. The multiphase polymeric material of claim 1, further comprising an additive selected from the group consisting of organic UV absorbers; inorganic UV absorbers; and heat stabilizers.

11. The multiphase polymeric material of claim 1, further comprising a pigment and/or dye.

12. The multiphase polymeric material of claim 11, wherein the polymeric material is a color selected from the group consisting of green, brown, brown and gray (peat-like), light gray, and multi-color.

13. The multiphase polymeric material of claim 1, wherein the rigid continuous phase has a density of from greater than 0.925 g/cm$^3$ to about 2.5 g/cm$^3$.

14. The multiphase polymeric material of claim 1, wherein the elastic phase has a density of at most 2 g/cm$^3$.

15. The multiphase polymeric material of claim 1, wherein the elastic polymer has a glass transition temperature lower than minus 15° C.

16. The multiphase polymeric material of claim 1, wherein the elastic polymer has a glass transition temperature lower than minus 45° C.

17. The multiphase polymeric material of claim 1, wherein the elastic polymer has a glass transition temperature lower than minus 55° C.

18. The multiphase polymeric material of claim 1, wherein the multiphase polymeric material has a coefficient of thermal expansion of 150 ppm/° C or less.

19. The multiphase polymeric material of claim 1, wherein the multiphase polymeric material has a coefficient of thermal expansion of less than 120 ppm/° C.

20. The multiphase polymeric material of claim 1, wherein the multiphase polymeric material has a coefficient of thermal expansion of less than 100 ppm/° C.

21. The multiphase polymeric material of claim 1, wherein the multiphase polymeric material has a notched Izod impact strength of at least 11 kJ/m$^2$ at minus 60° C. according to ASTM D256 or ISO 180.

22. The multiphase polymeric material of claim 1, further comprising a filler and a UV absorber,
wherein the multiphase polymeric material has improved UV resistance compared to a polymeric composition comprising HDPE, a filler, and a UV absorber.

23. The multiphase polymeric material of claim 1, wherein the elastic phase has an average particle size less than 10 microns.

24. The multiphase polymeric material of claim 1, wherein the elastic phase has an average particle size less than 5 microns.

25. The multiphase polymeric material of claim 1, wherein a joint formed from the multiphase polymeric material and having a weld width of 100 mm has a weld strength that is greater than 1000 N when measured at ambient and greater than 1000 N when measured at minus 20° C.

26. The multiphase polymeric material of claim 1, wherein a joint formed from the multiphase polymeric material and having a weld width of 100 mm has a weld strength that is greater than 1300 N when measured at ambient and greater than 1600 N when measured at minus 20° C.

27. A geomembrane formed from a plurality of polymeric strips, wherein each polymeric strip comprises the multiphase polymeric material of claim 1.

28. A geotextile formed from a plurality of polymeric strips, wherein each polymeric strip comprises the multiphase polymeric material of claim 1.

29. A geo-grid formed from a plurality of polymeric strips, wherein each polymeric strip comprises the multiphase polymeric material of claim 1.

30. A multiphase polymeric material which maintains stiffness and creep resistance over a temperature range of minus 70° C. to plus 90° C., the multiphase polymeric material comprising a rigid continuous phase and an elastic phase dispersed in the rigid continuous phase;

wherein the rigid continuous phase comprises two separate polymers, (i) a rigid polymer having a density of greater than 0.925 g/cm$^3$ and (ii) an engineering thermoplastic resin selected from the group consisting of polyamides and polyurethanes, the engineering thermoplastic resin comprising from about 5 to about 50 weight percent of the rigid phase;

wherein the elastic phase comprises two different elastic polymers, each having a density of at most 0.925 g/cm$^3$; and wherein the multiphase polymeric material has a 1% secant flexural modulus according to ASTM D790 of from about 600 MPa to about 2200 MPa at 20-25° C.;

a creep modulus of from about 400 MPa to about 1000 MPa at 20-25° C., a load of 20% of yield stress, and a loading time of 60 minutes, according to ISO 899-1;

a 1% secant flexural modulus according to ASTM D790 of from about 500 MPa to about 2800 MPa at minus 20° C.;

a creep modulus of from about 500 MPa to about 1500 MPa at minus 20° C.;

a tear strength according to ASTM D1004 of at least 20 N for a film thickness of 1 mm at 20-25° C.; and a tear strength according to ASTM D1004 of at least 10 N for a film thickness of 1 mm at minus 20° C.

31. A multiphase polymeric material which maintains stiffness and creep resistance over a temperature range of minus 70° C. to plus 90° C., the multiphase polymeric material comprising a rigid continuous phase and an elastic phase dispersed in the rigid continuous phase;

wherein the rigid continuous phase comprises a rigid polymer having a density of greater than 0.925 g/cm$^3$ and a filler having an average particle size of less than 10 microns;

wherein the elastic phase comprises an elastic polymer having a density of at most 0.925 g/cm$^3$; and wherein the multiphase polymeric material has a 1% secant flexural modulus according to ASTM 0790 of from about 600 MPa to about 2200 MPa at 20-25° C.;

a creep modulus of from about 400 MPa to about 1000 MPa at 20-25° C, a load of 20% of yield stress, and a loading time of 60 minutes, according to ISO 899-1;

a 1% secant flexural modulus according to ASTM D790 of from about 500 MPa to about 2800 MPa at minus 20° C.;

a creep modulus of from about 500 MPa to about 1500 MPa at minus 20° C.;

a tear strength according to ASTM D1004 of at least 20 N for a film thickness of 1 mm at 20-25° C.; and a tear strength according to ASTM D1004 of at least 10 N for a film thickness of 1 mm at minus 20° C.

* * * * *